United States Patent [19]

Miller

[11] 4,370,219

[45] Jan. 25, 1983

[54] HYDROCARBON CONVERSION PROCESS EMPLOYING ESSENTIALLY ALUMINA-FREE ZEOLITES

[75] Inventor: Stephen J. Miller, San Francisco, Calif.

[73] Assignee: Chevron Research Company, San Francisco, Calif.

[21] Appl. No.: 244,471

[22] Filed: Mar. 16, 1981

[51] Int. Cl.³ ............... C10G 47/16; C10G 69/04; C10G 69/12; C10G 11/05
[52] U.S. Cl. ................................. 208/59; 208/61; 208/66; 208/109; 208/118
[58] Field of Search .............. 208/59, 57, 66, 61, 208/109, 118

[56] References Cited

U.S. PATENT DOCUMENTS

| | | | |
|---|---|---|---|
| Re. 29,948 | 3/1979 | Dwyer et al. | 208/119 |
| 4,093,560 | 6/1978 | Kerr et al. | 208/120 |
| 4,244,807 | 1/1981 | Dautzenberg et al. | 208/66 |
| 4,309,275 | 1/1982 | Mulaskey | 208/109 |

*Primary Examiner*—Delbert E. Gantz
*Assistant Examiner*—O. Chaudhuri
*Attorney, Agent, or Firm*—D. A. Newell; S. R. La Paglia; S. H. Roth

[57] ABSTRACT

A process for converting a hydrocarbonaceous feedstock in which a catalytically hydroprocessed or a catalytically reformed feedstock is contacted under cracking conditions with an essentially alumina-free intermediate pore size zeolitic catalyst and immediately thereafter with a second essentially alumina-free intermediate pore size zeolitic catalyst under cracking conditions less severe than the first contacting conditions. The less severe conditions in the second contacting stage are preferably obtained by employing a lower temperature, although use of a less active catalyst to attain this end is a possibility. A crystalline chromia silicate having a mole ratio of oxides $SiO_2:Cr_2O_3$ of greater than about 20 to 1 and an intermediate pore size crystalline silicate of the ZSM-5 type having a mole ratio of oxides $SiO_2:Al_2O_3$ of greater than about 200 are the preferred catalysts.

24 Claims, No Drawings

HYDROCARBON CONVERSION PROCESS EMPLOYING ESSENTIALLY ALUMINA-FREE ZEOLITES

BACKGROUND OF THE INVENTION

The present invention relates to hydrocarbon processing in general and more particularly, to treating the product from a catalytic hydroprocessing or catalytic reforming process to increase the yield of liquid products. The present invention, therefore, is essentially a combination process for the upgrading of reformates and hydroprocessed products which employs a two-zone scheme and certain intermediate pore size essentially alumina-free zeolitic materials.

A combination process for the upgrading of a naphtha charge employing a particular sequence of catalyst compositions is described in U.S. Pat. No. 3,849,290 to Wise et al., incorporated by reference herein. In that process, a naphtha charge is reformed with a platinum reforming catalyst under reforming conditions to produce an aromatic-enriched product effluent comprising normal and branched hydrocarbons. The product of the reforming process is then contacted with a ZSM-5 type of crystalline aluminosilicate zeolite catalyst composition to selectively crack singly branched and normal hydrocarbons comprising $C_7$ and higher boiling hydrocarbons. Thereafter, the product of the selective cracking is contacted with a crystalline aluminosilicate zeolite hydrocracking catalyst of the erionite type under temperature and pressure conditions selected to crack n-paraffins without substantial cracking of multi-branched hydrocarbons.

U.S. Pat. No. 3,380,911 to Owen relates to a method and system for effecting catalytic cracking of relatively high boiling hydrocarbon feed materials by sequential contact with a plurality of catalyst composition of significantly different activity levels. In that method, a hydrocarbon feed material is combined with a first relatively high activity fluidizable catalytic material of relatively small particle size containing aluminosilicate constituents of water crystal structure to form a slurried mixture. Thereafter, the mixture along with vaporous material is combined with catalyst particles of significantly lower catalytic activity and passed as a dispersed mass through a second catalytic conversion zone. The second conversion zone is maintained under temperature conversion conditions in the range of from about 800° to about 1100° F. so that it may be equal to or higher than the temperature employed in the first conversion step comprising the limited conversion step with the higher activity aluminosilicate-containing catalyst. In other words, the cracking zone containing the most active cracking catalyst is maintained at a substantially lower temperature than the zone containing the lower activity catalyst particles.

SUMMARY OF THE INVENTION

The present invention relates to a process for converting a hydrocarbonaceous feedstock in which the feedstock is first subjected to a catalytic hydroprocessing or a catalytic reforming process. The processed feedstock is then contacted under cracking conditions with an essentially alumina-free intermediate pore size zeolitic catalyst and immediately thereafter with a second essentially alumina-free intermediate pore size zeolitic catalyst under cracking conditions less severe than the first contacting conditions.

DESCRIPTION OF THE PREFERRED EMBODIMENTS

The present invention relates to a process for converting a hydrocarbonaceous feedstock which is essentially an adjunct to either a catalytic hydroprocessing or a catalytic reforming process. The present invention may be employed in conjunction with such operations as hydrocracking, hydrodewaxing, naphtha hydrocracking, and reforming with contacting the feed with the catalyst of the hydrocracking or reforming operation preceding contacting with essentially alumina-free intermediate pore size zeolite in a two-zone scheme. The feedstocks employed in the practice of the present invention, therefore, are those feedstocks which are suitable for use in hydroprocessing and reforming processes. Suitable feedstocks include, for example, petroleum distillates or residuals, either virgin or partially refined, synthetic feeds, such as coal oils, bitumen, and shale oil. A suitable feed may also include recycled hydrocarbons which have already been subjected to cracking, for example, light, medium and heavy cycle oils.

Hydrocracking reaction conditions in the initial stage before the two-zone scheme generally include temperatures in the range 400° to 900° F., preferably 450° to 750° F., total pressures between 100 to 3000 psig, preferably between 200 to 2000 psig, partial pressures of hydrogen between 50 to 2900 psi, and preferably 150 to 1900 psi, and liquid hourly space velocities (LHSV's) from about 0.1 to 50 and preferably from about 0.5 to 4. Much higher total pressures and higher hydrogen partial pressure can be utilized.

A suitable catalyst for use in the hydrocracking reaction comprises a hydrogenation component and a cracking component. Preferably, the hydrogenation component is supported on a refractory cracking base. Suitable cracking bases include, for example, two or more refractory oxides such as a silica-alumina, silica-magnesia, silica-zirconia, alumina-boria, silica-titania, silica-zirconia-titania, acid-treated clays, and the like. Acidic metal phosphates such as alumina-phosphate may also be used. Preferred cracking bases comprise composites of silica and alumina. Additionally, particularly preferred in the present invention, are the partially dehydrated zeolitic crystalline molecular sieves of the X or Y crystal type, having relatively uniform pore diameters of about 8–10 Angstroms and comprising silica, alumina, and one or more exchangeable zeolitic cations alone or in intimate mixture with other amorphous bases. Particularly preferred are cracking supports containing from 20 to 100 weight percent zeolite.

The hydrogenation components are present upon the cracking base in an amount from 0.3 to 25%. Suitable hydrogenation components are selected from Group VI-B metals, Group VIII metals, their oxides, or mixtures thereof. Useful hydrogenation components comprise the oxides of chromium, tungsten, cobalt, nickel, tin, molybdenum, or the corresponding free metals, or any combination thereof. Particularly useful are the metals platinum, palladium, rhodium or iridium. The oxides of other transition metals, such as rhenium, can be used.

The process of this invention may also be employed in conjunction with dewaxing of hydrocarbon feedstocks, i.e., the removal of those hydrocarbons which readily solidify (waxes) from petroleum stocks. Hydrocarbon feeds which can be treated by dewaxing include lubricating oil stocks as well as those which have a freeze point or pour point problem, i.e., petroleum stocks boiling above about 350° F. Dewaxing can be carried out at either cracking or hydrocracking conditions.

Typical cracking conditions include a liquid hourly space velocity between about 0.5 and 200, a temperature between about 650° F. and 1100° F., a pressure between about subatmospheric and several hundred atmospheres.

For hydrodewaxing, operating conditions generally include temperatures between 650° F. and 1000° F., a pressure between 100 and 3000 psig, a liquid hourly space velocity between about 0.5 and 4 and a hydrogen rate of from about 100 to 20,000 cubic feet per bbl.

The present invention may also be used in conjunction with catalytic reforming processes. Reforming conditions will depend in large measure on the feed used, whether highly aromatic, paraffinic or naphthenic, and upon the desired octane rating of the product. The temperature in the reforming process will generally be in the range of about 600°–1100° F. and preferably about 700°–1050° F. The pressure in the reforming reaction zone can be atmospheric or superatmospheric. The pressure will generally lie within the range of from 25–1000 psig and preferably from about 50–750 psig. The temperature and pressure can be correlated with the liquid hourly space velocity (LHSV) to favor any particularly desirable reforming reaction as, for example, dehydrocyclization or isomerization. Generally, the liquid hourly space velocity will be from 0.1–10, and preferably from 1–5.

Reforming of a naphtha is accomplished by contacting the naphtha at reforming conditions and in the presence of hydrogen with the desired catalyst. Reforming generally results in the production of hydrogen. The hydrogen produced during the reforming process is generally recovered from the reaction products and preferably at least part of said hydrogen is recycled to the reaction zone. Preferably, the recycle hydrogen is substantially dried, as by being contacted with an adsorbent material such as a molecular sieve, prior to being recycled to the reaction zone. Thus, excess or make-up hydrogen need not necessarily be added to the reforming process, although it is sometimes preferred to introduce excess hydrogen at some stage of the operation, for example, during startup. Hydrogen, either as recycle or make-up hydrogen, can be added to the feed prior to contact with the catalyst or can be contacted simultaneously with the introduction of feed to the reaction zone. Generally, during startup of the process, hydrogen is recirculated over the catalyst prior to contact of the feed with the catalyst. Hydrogen is preferably introduced into the reforming reaction zone at a rate of from about 0.5 to 20 moles of hydrogen per mole of feed. The hydrogen can be in admixture with light gaseous hydrocarbons.

The catalyst employed in the reforming process is preferably one including a porous alumina-containing solid carrier, 0.01 to 3 weight percent platinum, 0.01 to 3 weight percent rhenium or 0.01 to 8 weight percent tin, and 0.01 to 3 weight percent halogen. Other suitable reforming catalysts are described in commonly-assigned U.S. Pat. Nos. 3,830,715 and 3,852,190, the disclosures of which are incorporated by reference.

It has been shown that essentially alumina-free forms of intermediate pore size zeolites of the ZSM-5-type such as silicalite can be used to crack paraffins to produce olefins, even at high hydrogen pressure. Such sieves have also been shown to be active for polymerizing olefins. These properties may be employed to improve liquid yield from the above-mentioned processes by cracking paraffins to olefins and then putting the light olefin back together to form a high-valued liquid.

This may be accomplished by employing a two-zone scheme in accordance with the present invention as an adjunct to hydroprocessing or reforming, for example, using one essentially alumina-free form of an intermediate pore size zeolite in a first reactor and the same form zeolite in a second reactor at a lower temperature. Alternatively, one essentially alumina-free intermediate pore size zeolite may be employed in one reactor and a less active form in a second reactor at a lower temperature than in the first reactor. Of course, the first or both essentially alumina-free intermediate pore size zeolites may be contained in the same or a different reactor from the hydroprocessing or reforming catalyst. Finally, pressure and/or space velocity may also be varied to produce a desired change in severity.

As used herein, the term "intermediate pore size zeolite" is a zeolite having an internal pore structure which will allow the entry of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom.

An essentially alumina-free crystalline silicate, intermediate pore size zeolite, that may be employed in accordance with the present invention is the crystalline silica polymorph called "silicalite," although the terminology "crystalline silicate" is employed herein to designate any intermediate pore size essentially alumina-free crystalline silicate in accordance with the present invention.

The terminology "crystalline silicate" as employed herein refers to silicates having a rigid, three-dimensional network of $SiO_4$ tetrahedra which are cross-linked by shared oxygen atoms. Crystalline silicates are essentially alumina-free, but often contain minor amounts of alumina because of impure starting materials or reaction vessel contamination. The silica-alumina mole ratio of the crystalline silicates useful in accordance with the present invention is greater than about 200:1, preferably greater than about 500:1 and most preferably greater than about 1000:1. Typical crystalline silicates in the calcined form have specific gravities of from about 1.50 to about 2.10 g/cc and a refractive index of about 1.3 to about 1.5.

Certain crystalline silicates which are useful in a process in accordance with the present invention have been prepared. Silicalite (U.S. Pat. No. 4,061,724) has, as synthesized, a specific gravity at 25° C. of 1.99±0.05 g/cc and a mean refractive index of 1.48±0.01. In the calcined form (600° C. in air for one hour), silicalite has a specific gravity of 1.870±0.05 g/cc and a refractive index of 1.39±0.01.

The X-ray powder diffraction pattern of the calcined form of silicalite exhibits the six strongest lines (i.e., interplanar spacings) set forth in Table A ("s"—strong, and "vs"—very strong):

TABLE A

| d-A | Relative Intensity |
|---|---|
| 11.1 ± 0.2 | vs |
| 10.0 ± 0.2 | vs |
| 3.85 ± 0.07 | vs |
| 3.82 ± 0.07 | s |
| 3.76 ± 0.05 | s |
| 3.72 ± 0.05 | s |

Table B shows the X-ray powder diffraction pattern of a typical silicalite composition containing 51.9 moles of $SiO_2$ per mole of $(TPA)_2O$, prepared according to the method disclosed in U.S. Pat. No. 4,061,724, and calcined in air at 600° C. for one hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Crystals of silicalite in both the synthesized and calcined form are orthorhombic and have the following unit cell parameters: a=20.05 A, b=19.86 A, c=13.36 A (all values±0.1 A).

Silicalite has a pore diameter of about 6 Angstroms and a pore volume of about 0.18 cc/gram as determined by adsorption. At room temperature, silicalite adsorbs neopentane (6.2 A kinetic diameter) slowly. Its uniform pore structure provides size-selective molecular sieve properties, and its pore size permits the separation of p-xylene from o-xylene, m-xylene and ethyl-benzene as well as the separation of compounds having quaternary carbon atoms from those having carbon-to-carbon linkages of lower value (e.g., normal and slightly branched paraffins).

The crystalline silicates disclosed in U.S. Pat. No. Re. 29,948 have a composition, in the anhydrous state:

$$0.9\pm0.2 \ [xR_2O+(1-x) \ M_{2/n}O]: <0.005$$
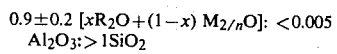

where M is a metal other than a metal of Group IIIA, n is the metal's valence, R is an alkyl ammonium radical and x is a number greater than 0 but not exceeding 1. The organosilicate is characterized by the X-ray diffraction pattern of Table C.

TABLE C

| Interplanar spacing d(a): | Relative Intensity |
|---|---|
| 11.1 | s |
| 10.0 | s |
| 7.4 | w |
| 7.1 | w |
| 6.3 | w |
| 6.04 | w |
| 5.97 | w |
| 5.56 | w |
| 5.01 | w |
| 4.60 | w |
| 4.25 | w |
| 3.85 | vs |
| 3.71 | s |
| 3.04 | w |
| 2.99 | w |
| 2.94 | w |

The crystalline silicate polymorph disclosed in U.S. Pat. No. 4,073,865 has a specific gravity of 1.70±0.05 g/cc. and a mean refractive index of 1.39±0.01 after calcination in air at 600° C. and is prepared by a hydrothermal process involving fluoride anions. The silicate crystals, which can be as large as 200 microns, exhibit both a substantial absence of infrared adsorption in the hydroxyl-stretching region and an exceptionally high degree of hydrophobicity. They exhibit the X-ray diffraction pattern of Table D.

TABLE D

| d(A) | Intensity |
|---|---|
| 11.14 | 91 |
| 10.01 | 100 |
| 9.75 | 17 |
| 8.99 | 1 |
| 8.04 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

The following method for the preparation of the crystalline silicate called "silicalite-2" was reported by Bibby et al. in Nature, 280, 664–665 (1979).

The silicalite-2 precursor may be prepared using only tetra-n-butylammonium hydroxide, although adding ammonium hydroxide or hydrazine hydrate as a source of extra hydroxyl ions increases the reaction rate considerably. A successful preparation is to mix 8.5 mole SiO₂ as silicic acid (74% SiO₂), 1.0 mole tetra-n-butylammonium hydroxide, 3.0 mole NH₄OH and 100 mole water in a steel bomb and heat at 170° C. for 3 days.

Crystalline silicates are generally prepared by hydrothermal crystallization of a reaction mixture comprising water, a source of silica and an organic templating compound at a pH of from about 10 to 14. Representative templating moieties include quaternary cations such as XR₄, wherein X is phosphorous or nitrogen and R is an alkyl radical containing from 2 to 6 carbon atoms, e.g., tetrapropyl ammonium hydroxide or halide, as well as alkyl hydroxyalkyl compounds, organic amines and diamines, and heterocycles such as pyrrolidone.

When the organic templating compound is present in the hydroxide form in sufficient quantity to produce a basicity equivalent to a pH of from 10 to 14, the reaction mixture need additionally contain only water and a reactive form of silica. Otherwise, ammonium hydroxide or an alkali metal hydroxide, particularly the hydroxides of lithium, sodium or potassium, may be added. Apparently, not more than 6.5 moles of alkali metal oxide per mole-ion of organic templating species are required even if the hydroxide form of templating compound is completely absent.

An alkali metal silicate is a suitable source of silica for preparing a crystalline silicate and should be employed in an amount so as not to adversely affect the molar ratio of alkali metal to organic templating compound. Other silica sources include solid reactive amorphous silica, e.g., fumed silica, silica sols, silica gel, and organic orthosilicates. Since alumina is readily incorporated as an impurity in the crystalline silica product, the silica source should be selected carefully to minimize the potential alumina impurity content. Commercially available silica sols typically contain from 100 to 700 ppm Al₂O₃, and fumed silicas may contain from 80 to 2000 ppm of Al₂O₃ impurity. Tetraethyl orthosilicate may be used to produce catalysts having a very low aluminum content.

The reaction mixture should generally contain from about 3 to 50 moles of SiO₂ and from about 100 to 700 moles of water per mole-ion of the organic templating compound. The reaction is preferably conducted in an aluminum free reaction vessel, which is resistant to alkali or base attack, e.g., teflon.

When alkali metal hydroxides are used in the reaction mixture for the formation of crystalline silicates, alkali metal cations appear as impurities in the crystalline product. Silicalite, as defined in U.S. Pat. No. 4,061,724, is high in sodium, i.e., contains greater than 1% of sodium and, therefore, does not give much conversion in short residence times. The concentration of alkali metal moieties in the crystalline silicate mass should be reduced by ion exchange or other suitable removal techniques to less than about 0.1 weight percent, preferably less than 0.03 weight percent and most preferably less than 0.01 weight percent.

Suitable ion exchange materials include those which are decomposable to hydrogen by calcination as are known in the art, for example, ammonium nitrate, as well as metal cations such as calcium, strontium, barium, zinc, silver, or the rare earth metals.

The residual alkali metal in the product can also be removed by washing with an aqueous acid solution of sufficient strength, e.g., hydrochloric acid. The crystal structure is not otherwise affected by contact with strong mineral acids even at elevated temperatures due to the lack of acid-soluble constituents in its crystal structure.

Another essentially alumina-free intermediate pore size zeolite useful in the practice of the present invention is the crystalline chromia silicate which is the subject of my copending U.S. application Ser. No. 160,618, filed June 25, 1980, and incorporated by reference herein. As disclosed, these chromia silicates have a silica:chromia ratio, in terms of mole ratios of oxides, greater than about 20:1 and an X-ray diffraction pattern characterized by the diffraction lines of Table 1.

TABLE 1

| d-A | Relative Intensity |
|---|---|
| 11.1 ± 0.2 | vs |
| 10.0 ± 0.2 | vs |
| 3.85 ± 0.07 | vs |
| 3.82 ± 0.07 | s |
| 3.76 ± 0.05 | s |
| 3.72 ± 0.05 | s |

These chromia silicates, hereinafter CZM, have a composition, expressed in the anhydrous state in terms of moles of oxides, which comprises:

$$R_2O:aM_2O:bCr_2O_3:cSiO_2$$

wherein R₂O is a quaternary alkylammonium oxide, preferably tetrapropylammonium oxide, M is an alkali metal selected from the group of alkali metals consisting of lithium, sodium, potassium or mixtures thereof, preferably sodium, a is between 0 and 1.5, c is greater than or equal to 12, and c/b is greater than 20. The ratio c/b will normally range between 20 and 3000, and is preferably in the range of 50 to 1000. This chromia silicate exhibits the random powder X-ray diffraction lines shown in Table 2.

TABLE 2

| Interplanar Spacing d (Angstrom) | 2θ (Doubled Bragg angle) | Normalized Intensities |
|---|---|---|
| 11.2 ± .2 | 7.90 | 100 |
| 10.05 ± .12 | 8.80 | 70 |
| 9.75 ± .11 | 9.07 | 17 |
| 8.99 ± .09 | 9.84 | 1 |
| 7.44 ± .06 | 11.90 | 1 |
| 6.71 ± .05 | 13.20 | 7 |
| 6.36 ± .05 | 13.92 | 11 |
| 5.99 ± .04 | 14.78 | 14 |
| 5.71 ± .04 | 15.53 | 7 |
| 5.57 ± .04 | 15.91 | 10 |
| 5.36 ± .03 | 16.54 | 3 |
| 5.14 ± .03 | 17.25 | 1 |
| 5.02 ± .03 | 17.65 | 5 |
| 4.98 ± .03 | 17.81 | 5 |
| 4.61 ± .02 | 19.25 | 4 |
| 4.36 ± .02 | 20.37 | 5 |
| 4.25 ± .02 | 20.88 | 8 |
| 4.08 ± .02 | 21.78 | 2 |
| 4.01 ± .02 | 22.18 | 3 |
| 3.86 ± .02 | 23.07 | 52 |
| 3.82 ± .02 | 23.29 | 32 |
| 3.75 ± .02 | 23.73 | 17 |
| 3.72 ± .02 | 23.73 | 26 |
| 3.65 ± .02 | 24.40 | 12 |
| 3.60 ± .01 | 24.76 | 2 |
| 3.48 ± .01 | 25.58 | 2 |
| 3.44 ± .01 | 25.88 | 4 |
| 3.40 ± .01 | 26.24 | 1 |
| 3.35 ± .01 | 26.60 | 3 |
| 3.31 ± .01 | 26.95 | 6 |
| 3.25 ± .01 | 27.43 | 2 |
| 3.05 ± .01 | 29.28 | 4 |
| 2.99 ± .01 | 29.90 | 9 |

TABLE 2-continued

| Interplanar Spacing d (Angstrom) | 2θ (Doubled Bragg angle) | Normalized Intensities |
|---|---|---|
| 2.96 ± .01 | 30.22 | 4 |

The X-ray diffraction pattern of these chromia silicates is similar to the patterns exhibited by the ZSM-5-type aluminosilicates.

The X-ray diffraction patterns were obtained by standard diffractometer methods using a copper target X-ray tube, a graphite crystal monochromator set to select the K-alpha doublet radiation of copper, and a proportional counter tube operating to selectively measure the reflected K-alpha doublet radiation. The patterns were recorded with a strip chart recorder and the diffraction peak intensities normalized to a scale of 0 to 100. The interplanar spacings, d (measured in angstroms), corresponding to the recorded diffraction peaks were calculated.

The crystalline chromia silicate is prepared by hydrothermally crystallizing an aqueous reaction mixture containing quaternary alkylammonium oxide, chromium oxide, silica and an oxide of an alkali metal from the group of alkali metals consisting of lithium, sodium, potassium or mixtures thereof, preferably sodium.

The reaction mixture preferably has a composition expressed in terms of moles of oxides, as follows:

$$R_2O:aM_2O:bCr_2O_3:cSiO_2:dH_2O$$

wherein a is greater than 0 but less than 5, c is in the range 1 to 100, the ratio c/b is greater than 12 but less than 800, and d is in the range, 70–500. Preferably, a is in the range 0.05 to 1, c is in the range 2–20, the ratio c/b is in the range 30 to 600 and d is in the range 100 to 300. Hydrothermal crystallization is preferably conducted at a temperature in the range of 100° to 200° C., more preferably at 125° to 175° C., and still more preferably at 150° C. The crystallization is conveniently conducted at the autogenous pressure of the reaction mixture.

ILLUSTRATIVE EMBODIMENTS

Following catalytic hydroprocessing, processed feedstock is contacted with CZM under cracking conditions including a temperature of at least 650° F., preferably from about 650° to 1100° F., a pressure of from 0 to about 2000 psig, an LHSV of from about 0.1 to 10 and a hydrogen rate of from 0 to about 10,000 SCF/bbl, whereby paraffins in the processed feed are cracked to olefins. A layered fixed bed of hydroprocessing catalyst followed by CZM may be employed.

A second catalytic contacting is now conducted immediately after the first under cracking conditions which are less severe than in the first contacting stage to polymerize the olefins formed in that stage to a high-valued liquid. These conditions include a temperature of from about 400° to 700° F., a pressure of from 0 to about 2000 psig, an LHSV of from about 0.1 to 10 and an H₂ rate of from 0 to 10,000 SCF/bbl. Another layer of catalyst having a lower cracking activity than CZM, such as silicalite may be added to the layered fixed bed. Of course, either the silicalite alone or a CZM-silicalite layered fixed bed may be placed in a separate reactor from the hydroprocessing catalyst.

In practice, the pressure employed will depend on the alumina content of the catalyst. If the silica-alumina ratio is high, higher pressures could be used. Conversely, if the ratio is low, lower pressures are generally employed. For example, for silicalite having a silica-alumina ratio of about 300:1, the pressure is preferably less than about 400 psig, and for silicalite having a silica-alumina ratio of about 1000:1, the pressure is preferably less than about 1000 psig.

EXAMPLES

The following experiments were conducted to demonstrate the improvement in liquid yield obtained by practicing the present process.

Equal amounts of a catalyst comprising silicalite having a molar ratio of oxides $SiO_2:Al_2O_3$ of about 220 bound with 35% Catapal alumina were placed in two sections of a stainless steel reactor. The space between the catalysts was filled with alundum. The catalysts were positioned in a twin clamshell furnace so that the temperature of each catalyst-containing section could be independently controlled.

All runs were conducted under the following conditions:

| Feed: | n-decane |
|---|---|
| Pressure: | 25 psig |
| H₂: hydrocarbon: | 11 |
| H₂ rate: | 210 SCF/bbl |
| LHSV: | 2 over each catalyst bed |

The results of the runs are set forth in the following Tables. (The $C_1$–$C_{10}$ figures represent weight percent.) The $C_5^+$ selectivity improves quite significantly and unexpectedly when a process according to the present invention is used.

TABLE I

| Temperature, °F. (Zone 1/Zone 2) | 670/570 | 690/690 | 770/570 | 770/770 |
|---|---|---|---|---|
| $C_1$ | 0 | 0 | 0 | 0.1 |
| $C_2$ | 0.3 | 0.6 | 0.9 | 1.6 |
| $C_3$ | 7.6 | 10.7 | 9.3 | 12.9 |
| $C_4$ | 15.9 | 21.2 | 14.8 | 16.3 |
| $C_5$ | 11.0 | 9.5 | 9.9 | 10.6 |
| $C_6$ | 6.2 | 3.7 | 5.6 | 5.0 |
| $C_7$ | 2.4 | 0.8 | 1.9 | 1.2 |
| $C_8$ | 1.3 | 0.2 | 0.7 | 0.7 |
| $C_9$ | 0.1 | 0.1 | 0.1 | 0 |
| $C_{10}$ | 55.2 | 53.2 | 56.8 | 51.6 |
| Conversion, % | 44.8 | 46.8 | 43.2 | 48.4 |
| $C_5^+$, wt. % | 76.2 | 67.5 | 75.0 | 69.1 |
| $C_5^+$ Selectivity, % | 47 | 31 | 42 | 36 |

TABLE II

| Temperature, °F. (Zone 1/Zone 2) | 690/690 | 670/570 | 770/570 | 760/760 | 760/760 |
|---|---|---|---|---|---|
| Yields/Wt. % | | | | | |
| $C_1$ | 0 | 0 | 0 | 0.1 | 0.1 |
| $C_2$ | 0.6 | 0.3 | 0.9 | 1.6 | 1.5 |
| $C_3$ | 10.7 | 7.6 | 9.3 | 13.4 | 12.6 |
| $C_4$ | 21.2 | 18.2 | 14.8 | 14.1 | 12.5 |
| $C_5$ | 9.5 | 12.3 | 9.9 | 6.9 | 6.1 |
| $C_6$ | 3.7 | 6.1 | 5.6 | 2.1 | 1.7 |
| $C_7$ | 0.8 | 2.0 | 1.9 | 1.0 | 0.9 |
| $C_8$ | 0.2 | 0.5 | 0.7 | 0.1 | 0 |
| $C_9$ | 0.1 | 0 | 0.1 | 0 | 0 |
| $C_{10}$ | 53.2 | 53.0 | 56.8 | 60.7 | 64.6 |
| Conversion, % | 46.8 | 47.0 | 43.2 | 39.3 | 35.4 |
| $C_5^+$, wt. % | 67.5 | 73.9 | 75.0 | 70.8 | 73.3 |
| $C_5^+$ Selectivity, % | 31 | 45 | 42 | 26 | 25 |
| $C_4$ P/E | 1.02 | 1.25 | 0.83 | 0.61 | 0.61 |

$$C_5^+ \text{ selectivity} = \frac{C_5^+ - C_{10} \text{ (unconverted)}}{\text{conversion}}$$

Although the present invention has been described with reference to particular preferred embodiments, it should be understood that obvious modifications will suggest themselves to those of ordinary skill in the art. It is, therefore, the intent that the present invention not be limited by the specific examples but only defined in the following claims.

What is claimed is:

1. A process for converting a hydrocarbonaceous feedstock by subjecting the feedstock to catalytic reactions in three zones, the process comprising the steps of catalytically hydroprocessing the feedstock in a first reaction zone, contacting the product of the first zone in a second reaction zone under cracking conditions including a temperature of from about 650°–1100° F., a pressure of from about 0–2000 psig and an LHSV of from about 0.1–10 with a first catalyst comprising an essentially alumina-free intermediate pore size zeolite and, immediately thereafter, contacting the product of the second reaction zone in a third reaction zone with a second catalyst comprising an essentially alumina-free intermediate pore size zeolite under cracking conditions less severe than the cracking conditions in the second reaction zone including a temperature of from about 400°–700° F., a pressure of from about 0–2000 psig and an LHSV of from about 0.1–10 wherein the less severe cracking conditions are obtained by maintaining a lower temperature in the third reaction zone than in the second reaction zone so as to favor polymerization in the third zone of olefins formed in the second zone whereby selectivity to $C_5^+$ is increased.

2. The process of claim 1 wherein the second and third reaction zones are contained within different reactors.

3. The process of claim 1, wherein the first reaction zone is contained in a first reactor and the second and third reaction zones are contained in a second reactor.

4. The process of claim 1 wherein the first and second catalysts comprise a ZSM-5 type crystalline silicate having a mole ratio of oxides $SiO_2:Al_2O_3$ of greater than about 200.

5. The process of claim 1 wherein the first and second catalysts comprise a ZSM-5 type crystalline silicate having a mole ratio of oxides $SiO_2:Al_2O_3$ greater than about 500.

6. The process of claim 1 wherein the first and second catalysts comprise a ZSM-5 type crystalline silicate having a mole ratio of oxides $SiO_2:Al_2O_3$ greater than about 1000.

7. The process of claim 1 wherein the first and second catalysts comprise a crystalline chromia silicate having a mole ratio of oxides $SiO_2:Cr_2O_3$ greater than about 20 and having the random powder X-ray diffraction lines of Table 2.

8. The process of claim 1, wherein the first and second catalysts have the same composition and pore structure.

9. The process of claim 8 wherein the first and second catalysts comprise a crystalline chromia silicate having a mole ratio of oxides $SiO_2:Cr_2O_3$ greater than about 20 and having the random powder X-ray diffraction lines of Table 2.

10. The process of claim 8 wherein the intermediate pore size zeolite has the characteristic random powder X-ray diffraction lines of Table A.

11. The process of claim 8 wherein the intermediate pore size zeolite has the characteristic random powder X-ray diffraction lines of Table C.

12. The process of claim 8 wherein the first and second catalysts comprise a ZSM-5 type crystalline silicate having a mole ratio of oxides $SiO_2:Al_2O_3$ greater than about 200.

13. A process for converting a hydrocarbonaceous feedstock by subjecting the feedstock to catalytic reactions in three zones, the process comprising the steps of catalytically reforming the feedstock in a first reaction zone, contacting the product of the first zone in a second reaction zone under cracking conditions including a temperature of from about 650°–1100° F., a pressure of from about 0–2000 psig and an LHSV of from about 0.1–10 with a first catalyst comprising an essentially alumina-free intermediate pore size zeolite and, immediately thereafter, contacting the product of the second reaction zone in a third reaction zone with a second catalyst comprising an essentially alumina-free intermediate pore size zeolite under cracking conditions less severe than the cracking conditions in the second reaction zone including a temperature of from about 400°–700° F., a pressure of from about 0–2000 psig and an LHSV of from about 0.1–10 wherein the less severe cracking conditions are obtained by maintaining a lower temperature in the third reaction zone than in the second reaction zone so as to favor polymerization in the third zone of olefins formed in the second zone whereby selectivity to $C_5^+$ is increased.

14. The process of claim 13 wherein the second and third reaction zones are contained within different reactors.

15. The process of claim 13 wherein the first reaction zone is contained in a first reactor and the second and third reaction zones are contained in a second reactor.

16. The process of claim 13 wherein the first and second catalysts comprise a ZSM-5 type crystalline silicate having a mole ratio of oxides $SiO_2:Al_2O_3$ of greater than about 200.

17. The process of claim 13 wherein the first and second catalysts comprise a ZSM-5 type crystalline silicate having a mole ratio of oxides $SiO_2:Al_2O_3$ greater than about 500.

18. The process of claim 13 wherein the first and second catalysts comprise a ZSM-5 type crystalline silicate having a mole ratio of oxides $SiO_2:Al_2O_3$ greater than about 1000.

19. The process of claim 13 wherein the first and second catalysts comprise a crystalline chromia silicate having a mole ratio of oxides $SiO_2:Cr_2O_3$ greater than about 20 and having the random powder X-ray diffraction lines of Table 2.

20. The process of claim 13, wherein the first and second catalyst have the same composition and pore structure.

21. The process of claim 20 wherein the first and second catalysts comprise a crystalline chromia silicate having a mole ratio of oxides $SiO_2:Cr_2O_3$ greater than about 20 and having the random powder X-ray diffraction lines of Table 2.

22. The process of claim 20 wherein the intermediate pore size zeolite has the characteristic random powder X-ray diffraction lines of Table A.

23. The process of claim 20 wherein the intermediate pore size zeolite has the characteristic random powder X-ray diffraction lines of Table C.

24. The process of claim 20 wherein the first and second catalysts comprise a ZSM-5 type crystalline silicate having a mole ratio of oxides $SiO_2:Al_2O_3$ greater than about 200.

* * * * *